United States Patent Office 3,500,388
Patented Mar. 10, 1970

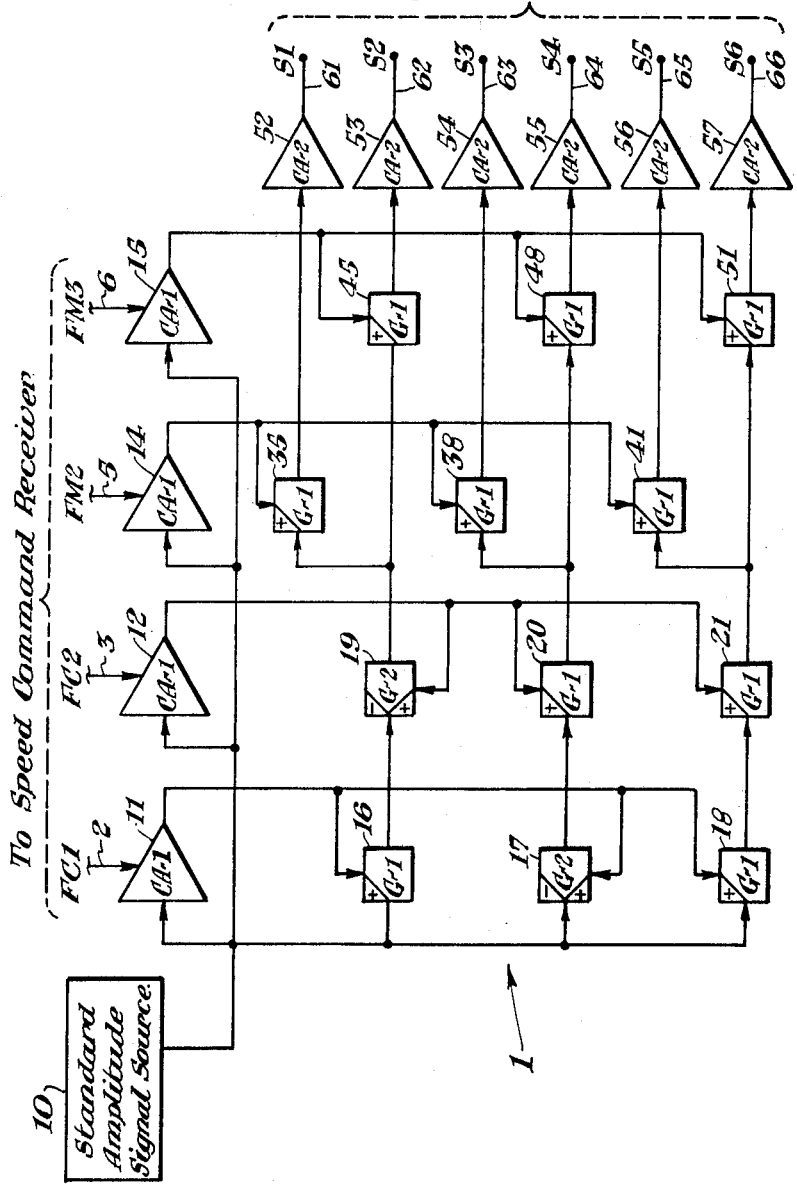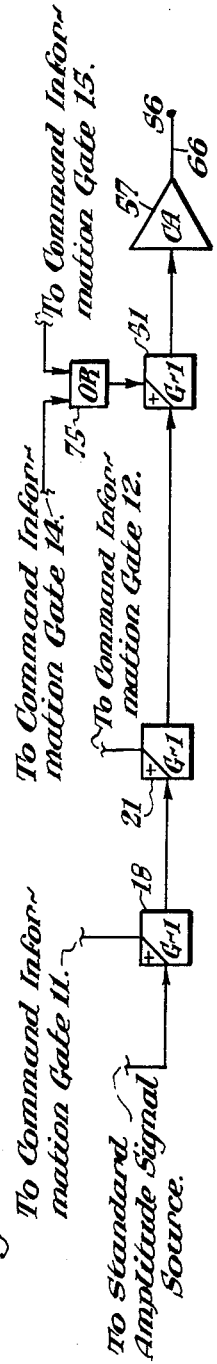
Fig. 2.
Fig. 3.

3,500,388
FAIL-SAFE LOGIC SPEED COMMAND DECODER
Donald B. Marsh, Penn Hills, and Walter W. Sanville, Eastmont, Pa., assignors to Westinghouse Air Brake Company, Swissvale, Pa., a corporation of Pennsylvania
Filed Nov. 5, 1965, Ser. No. 506,558
Int. Cl. H03k 13/00; H04l 3/00; G06f 5/02
U.S. Cl. 340—347
25 Claims

ABSTRACT OF THE DISCLOSURE

This disclosure relates to a fail-safe information decoding network having a plurality of gated amplifiers electrically coupled to a separate one of a plurality of input signals. The network includes a logic matrix having a plurality of fail-safe gated circuits forming quasi-tree circuits. Each of the quasi-tree circuits includes a trunk and branch portions electrically interconnected with the gated amplifiers. A source of A.C. signals is electrically coupled to each of the gated amplifiers and to each trunk portion of the quasi-tree circuits. An output amplifier is electrically coupled to the separate branch portions of the quasi-tree circuits so that a predetermined circuit path is established between one of output amplifiers and the A.C. signal source in accordance with the present of at least two of the input signals.

---

Our invention relates to information decoding apparatus and, more specifically, to fail-safe logic speed command decoder networks which find particular utility in vehicle speed control sytems.

In modern rail-type mass and/or rapid transit operations, the cab signaling system has been expanded to include the train speed control equipment wherein trains receive speed commands in the form of coded information for semi-automatic or fully automatic operation. However, such features as reduced headway and increased speed have demanded that such transit operations function not only with increased efficiency but also with decreased response time. A further requirement of such transit operations is that the apparatus operate in a fail-safe fashion, that is, under any equipment malfunction, such as a component failure, the system must produce either a more restrictive output or no output at all. Obviously, this latter requirement, namely, fail-safe operation, is not only essential from the standpoint of preventing equipment damage but also compulsory from the standpoint of reducing and eliminating the possibility of physical injury to persons managing and using such a transit facility.

Normally in such transit operations, the distinct cab signal information or the specific speed command is generated by suitable wayside transmitter equipment including a cab oscillator-encoder which functions to produce a plurality of carrier frequencies modulated alternately or separately by a select one of a plurality of modulating frequency signals. The wayside transmitter equipment, in turn, is electrically connected by means of cables and suitable bonding means to the running rails of either an A.C. or D.C. propulsion system wherein both running rails are used for negative return. Accordingly, the speed command signals are effectively superimposed on the running rails and cross bonding minimizes the negative propulsion current return voltage drop. The rails are preferably continuous, except as interlockings, that is, a welded rail is used, so that the number of insulated rail joints is greatly reduced. It may be noted that the rail impedance is sufficiently high at the signal command frequency ranges to confine and sharply define sections of a track within satisfactory limits. The use of continuous rails is a decided advantage in rail mass transportation system operations since the expense of providing and maintaining a greater number of insulated rail joints which is a necessary and essential feature in sustaining close headways is obviously eliminated. The cab signaling track energy fed to the rails is inductively transferred to the train carried apparatus through a pair of train carried receiver coils mounted ahead of the front axle of the vehicle in the direction of movement. The induced signals are then filtered, amplified, and detected, and, in turn, applied as input command signals to the decoding apparatus which logically deciphers the information to provide suitable outputs to a velocity control programmer or a servo unit, which will respond to discrete speed command signals for semi-automatically or completely automatically controlling the train operations.

As is readily apparent, the requirements of the speed command decoder network are exacting because this apparatus is responsible for accurately responding to the coded command signals, and for correctly decoding the delivered command signals, and also for precisely delivering output signals corresponding to the speed command signals to the traction system for train control. Specifically, the function of the decoding apparatus is to act upon the coded information provided by the receiver coils and to produce corresponding output signals to the train control equipment in a fail-safe manner. As previously mentioned, in speed control systems of this type, it is of vital and utmost importance, and in many cases an authoritative requirement, to ensure that during a malfunctional condition a less restrictive condition of the output signal is incapable of being produced. That is, in case of a component failure the decoding apparatus must assume a more restrictive operational condition so that the train traction apparatus is capable either of initiating a full service brake application or stabilizing its operation at a lower safety speed than the speed command signal being received by the speed decoding apparatus.

Accordingly, it is an object of the present invention to provide a new and improved information decoding apparatus.

A further object of the present invention is to provide a unique information decoding network for use in a vehicle speed control system.

Another object of the present invention is to provide an improved speed command decoder network which operates in a fail-safe manner.

Still another object of the present invention is to provide an improved speed command decoder network which provides an output indicative of the most restrictive condition during a malfunctional condition.

Still another object of the present invention is to provide a fail-safe speed command decoder network which produces a selective choice or a particular one of a plurality of outputs indicative of a valid speed command during normal operating conditions and which produces no output signal during abnormal operating conditions.

Yet another object of the present invention is to provide speed command decoding apparatus which is capable and responsible for accurately deciphering input signals derived from modulated carrier information.

A still further object of the present invention is to provide a fail-safe speed command decoder network which is simple in construction, economical in cost, and reliable in operation.

Briefly, the present invention relates to fail-safe information decoding networks which produce a selected choice or a particular one of a plurality of outputs in response to the reception of at least two preselected inputs of a plurality of input signals. The preselected input signals are applied to at least two of a plurality of input conductors which are electrically and separately coupled to a plurality of command information gates. A standard amplitude signal source is coupled to each of the command information gates for delivering A.C. input signals thereto. A logic matrix comprising a plurality of signal passing gates and signal stop gates arranged in three quasi-tree circuits is electrically coupled to and controlled by output signals derived from the command information gates. The trunk portion of each of the three quasi-tree circuits is also electrically connected to and receives A.C. signals from the standard amplitude signal source. The branch portions of the three quasi-tree circuits are each connected to separate power amplifiers which are individually connected to a plurality of output conductors. A circuit path is established from the standard amplitude signal source through preselected trunk and branch portions of one of the three quasi-tree circuits and an output appears on the selected one of the plurality of output conductors in response to input signals applied to the preselected input conductors.

In a first embodiment of the invention, the plurality of input conductors number five while the plurality of output conductors number nine. The first quasi-tree circuit includes a signal passing gate and a signal stop gate in cascade along with three branch circuits having one signal passing gate and two signal stop gates cascaded. The second quasi-tree circuit includes a signal stop gate and a single passing gate in cascade along with three branch circuits having two signal stop gates and one signal passing gate in cascade. The third quasi-tree circuit includes a trunk portion having two signal passing gates in cascade along with three branch portions having one signal passing gate and two signal stop gates in cascade. An emitter-follower stage electrically interconnects the trunk portion of each of the three quasi-tree circuits with its associated branch portions.

In a second embodiment of the invention, the plurality of input conductors number four while the plurality of output conductors number six. While the trunk portions of the three quasi-tree circuits of this embodiment are substantially identical to that of the first embodiment, the branch portions are distinct in that each tree circuit has only two branches having a single signal passing gate.

A third embodiment of the present invention is a modification of the second embodiment. While this last embodiment includes four input conductors only five output conductors are utilized therein. The quasi-tree logic matrix includes two trees which are identical to those of the second embodiment but includes a third tree having a single branch comprising an OR gated signal passing gate.

The above objects and other attendant features and advantages of this invention will become more fully evident from the following detailed description when considered in connection with the accompanying drawings wherein:

FIG. 2 is a schematic block diagram illustrating another embodiment of the present invention.

FIG. 3 is a partial schematic block diagram illustrating a modification of the embodiment shown in FIG. 2.

Figure 1:
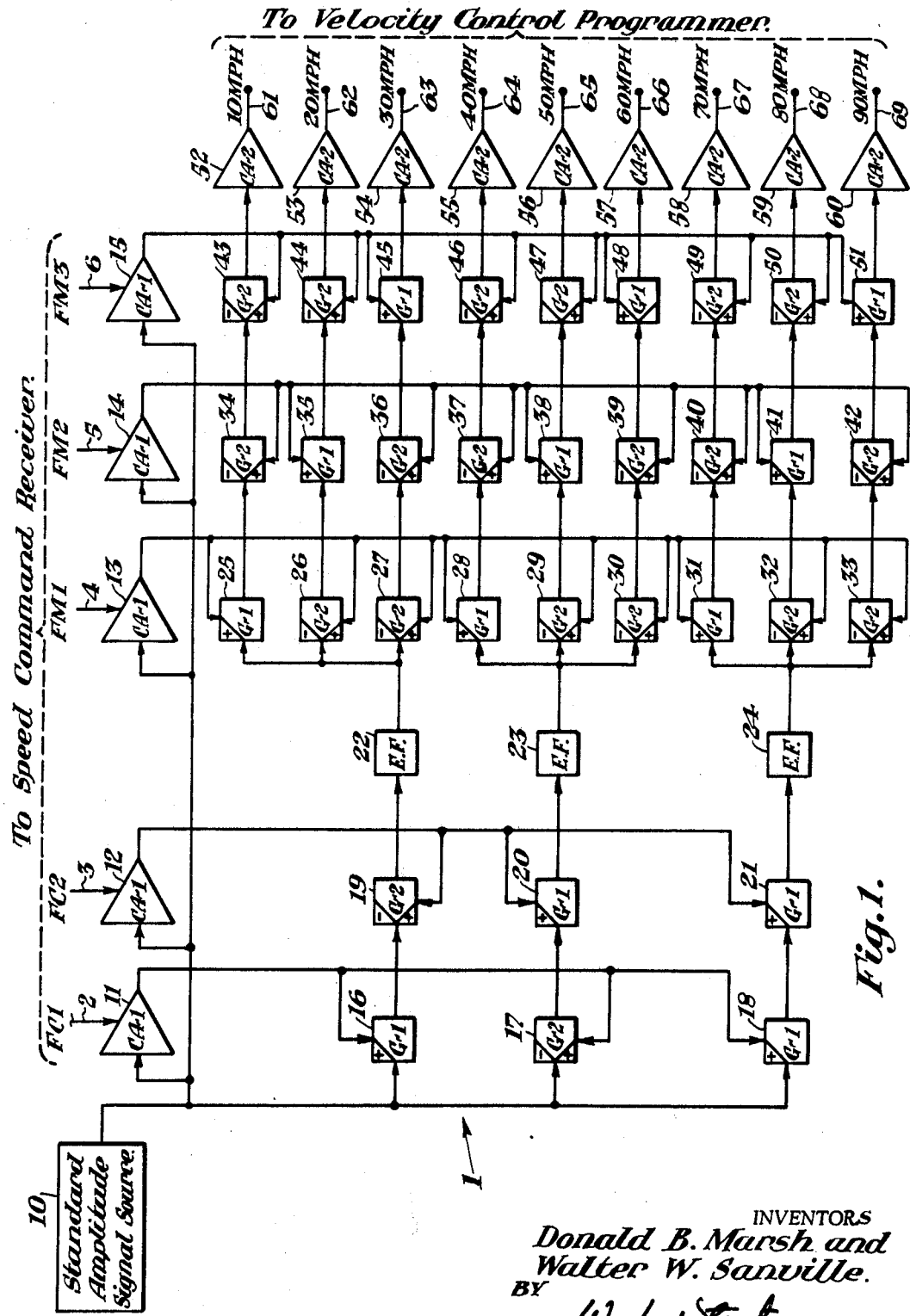
FIG. 1 is a schematic block diagram illustrating one embodiment of the present invention.

Referring to the drawings, and in particular to FIG. 1, the information or speed command decoding network, included in the train carried apparatus, is generally illustrated by reference character 1.

In viewing FIG. 1, it will be readily noted that the speed command decoder network 1 comprises a standard amplitude signal source 10, a plurality of input leads or conductors 2, 3, 4, 5 and 6, a command information gate CA–1 for each input conductor, a logical matrix including a plurality of gating elements G–1 and G–2 along with a plurality of output conductors 61, 62, 63, 64, 65, 66, 67, 68 and 69 with a relay driver amplifier CA–2 interconnected with each of the output conductors for producing an appropriate output to a velocity control programmer. The plurality of inputs, designated as FC1, FC2, FM1, FM2 and FM3, are derived from the speed command receiver of the train carried apparatus to provide the speed command information or signals to the decoding network over conductors 2, 3, 4, 5 and 6, respectively.

Before proceeding with the remaining description and operation of the train carried apparatus, it may be of benefit to briefly discuss the code format in order to more fully appreciate the function of the entire apparatus and, in turn, those of the speed command receiver, and, in particular, the speed command decoding network. The speed command information or signal energy transmitted to the running rails by the wayside apparatus is in the form of modulated carrier frequency signals. In order to provide nine separate and distinct cab signal indications or speed commands two carrier frequencies, namely, FC1 and FC2, are modulated by three modulating signals, namely, FM1, FM2 and FM3 to provide the various speed command signals. As previously mentioned, the two carrier frequencies, which may be in the audio range and in the particular case at hand are at 990 and 1170 cycles per second, are singularly or alternately modulated by any one of three modulating signal rates, which may be in the sub-audio range, namely 10, 7.5 or 6 cycles per second. The nine possible valid speed commands are divided into three speed ranges which are as follows:

Range 1 consists of a modulated 990 cycles per second signal alone.

Range 2 consists of a modulated 1170 cycles per second frequency signal alone.

Range 3 consists of alternating modulated 990 and 1170 cycles per second signals.

In general, the modulated 990 cycles per second signal is considered the lowest speed band, the modulated 1170 cycles per second signal is considered the intermediate speed band, and the alternately modulated 990 and 1170 cycles per second signals are considered the highest speed band. The three above-mentioned ranges or bands are further divided into three sub-divisions whereby the nine discrete speed commands are readily available. For example, the carrier frequency of each range or band can be modulated by either of the three sub-audio signals, namely, 6, 7.5 or 10 cycles per second. For example, a carrier wave modulated by a sub-audio signal or 6 cycles per second will be called the lowest speed of a range, whereas a carrier wave modulated by a 7.5 sub-audio signal will be called the mid-speed of a range, and a carrier wave modulated by a 10 cycle per second sub-audio signal will be called the highest speed of a particular range.

As previously mentioned, the command signals of range 3 consists of alternately modulated signals of the carrier wave frequencies 990 and 1170 cycles per second. That is, for signals in range 3 to operate as valid speed command signals, the modulation must be such that the 1170 cycles per second signal is turned "on" when the 990 cycles per second signal is turned "of," and the 990 cycles per second signal is turned "on" when the 1170 cycles per second signal is turned "off." That is, the modulated speed command signals of range 3 must be 180° out of phase. In the event that the two modulated frequencies are simultaneously available from the running rails, the speed command receiver is arranged to reject both of the modulated signals so that no speed command signals are applied to the input conductors 2, 3, 4, 5 and 6 of the speed command decoder network. Either the absence of a modulated carrier signal or the appearance of both of the modulated carrier signals, is defined as the most restrictive signal or stop command for the train carried apparatus and provides a tenth command whereby the vehicle is either brought to a complete stop or stabilized at some low safety speed level.

As previously mentioned, the speed command signals transmitted to the running rails from the wayside apparatus are inductively picked up by a pair of pick-up coils mounted on the leading end of the train. The two pick-up coils are arranged so that noise pulses which normally flow in the same direction along both running rails tend to cancel each other, that is, the induced noise pulses are in series opposition, whereas speed command signals which flow in opposite directions along both running rails tend to aid each other, that is, the induced speed command signals are in series additive relationship. The signals induced in the two pick-up coils are then passed through a series of high-pass and trap filters, channel splitting transformer and then through separate trap and bandpass filters, and thereafter through suitable amplifying means whereby the amplitude of the signals is raised. The amplified signal, in turn, is applied to a detector which includes signal level rejection means whereby signals below a certain level are regarded as cross-talk and are therefore rejected. At this point, it may be noted that the detected modulated signals will appear on either one of the two channels and should have either of the three modulated frequencies of 6, 7.5 or 10 cycles per second. Each channel, in turn, is connected to a linear amplifier and finally to a detector wherein the carrier wave is converted to a direct current signal. In addition, each channel is connected through suitable safety apparatus to three very narrow bandpass filters which are turned to 6, 7.5 or 10 cycles per second, respectively. The bandpass filters, in turn, are connected to three detectors wherein the modulating signal is also converted to a direct current signal. The direct current output signals produced by the speed command receiver which are indicative of the carrier waves FC1 and FC2 and each of the modulating signals FM1, FM2 and FM3 are suitably connected to leads or conductors 2, 3, 4, 5 and 6, as shown in FIG. 1, which are employed as speed command inputs for the speed command decoder network.

Referring to the drawings, it may be of interest to note that the standard amplitude singal source 10 shown in FIG. 1 is generally of the type described in a copending application Ser. No. 486,270, filed Sept. 10, 1965 to Donald B. Marsh, for "Fail-Safe Standard Amplitude Signal Sources." The disclosure of this application is hereby incorporated in the present disclosure for a more detailed description of the standard amplitude signal source than the one which follows. The standard amplitude signal source 10 is adapted to produce alternating current signals, in the form of square waves having a constant amplitude. This source includes a signal generating means in the form of a multivibrator or other suitable oscillating means for producing a source of alternating current signals. The standard amplitude signal source includes a shunt voltage regulator for limiting and regulating amplitude swing of the alternating current signals. However, since shunt regulators are susceptible to a complete regulation loss during an open-circuited condition, a photosensitive monitoring means is interconnected to the shunt regulator for monitoring the electrical condition of the regulator. If the shunt regulator should become open-circuited, the photosensitive monitoring means is effective in blocking the alternating current signals. During normal operation, the regulated signals are fed to an amplifier arrangement including a constant voltage amplifier stage and an emitter-follower amplifier stage which includes an output terminal for deriving the constant amplitude voltage signals. The entire circuit is fail-safe in that any component failure will cause a disappearance of the output singals at the output terminal. Accordingly, the standard amplitude signal source provides and insures that the output signals at the output terminal are in the form of square waves having a peak-to-peak value of two (2) volts during normal operating conditions.

The blocks designated G-1 are signal passing gates which are of the type generally as described in our copending application Ser. No. 483,953, filed Aug. 31, 1965, now Patent No. 3,430,066 for a fail-safe "AND" logic circuit. Similarly, the disclosure of this latter application is hereby incorporated in the present disclosure for a more detailed description of the particulars of the logic circuit. Briefly, each of the signal passing gates G-1 includes an N-P-N transistor forming an A.C. amplifier which produces a first logical function indicating the least restrictive condition during the presence of a pair of input signals and which produces a second logical function indicating the most restrictive condition during the absence of either or both of the input signals. For example, during the presence of both an A.C. and a D.C. input signal the logic circuit functions as a signal passing gate so that A.C. signals are readily available at the amplifier output terminal which is defined as the least restrictive or the assertion condition. During the absence of either or both of the A.C. and the D.C. input signals, the logic circuit functions as a signal blocking gate so that no output signals are available at the output terminal which is defined as the most restrictive or the negation condition. Further, the gates G-1 operate in a fail-safe manner in that the logic circuit is only capable of producing the first logical function indicating the least restrictive conditions during normal periods of operation. That is, during the failure of any component of the logic circuit no output signal is available at the output terminal which is indicative of the most restrictive or negation condition so that fail-safe operation is ensured.

The blocks designated G-2 are signal stop gates which are very similar structurally to the signal passing gates but operate in inverse fashion. Like gates G-1, each of these gates include an A.C. amplifier which normally allows the passage of A.C. signals to the amplifier output terminal during the absence of a positive D.C. inhibiting potential. However, during the presence of the positive D.C. potential the gate prevents or inhibits the passage of the A.C. signals. That is, since the signal stop gate employs a P-N-P transistor the positive D.C. potential is effective in biasing the transistor to its "off" or nonconducting condition so that output signals are not available at the output terminal. As in the signal passing gate, the signal stop gate includes an A.C. attenuating network having an attenuating factor which is equal to the gain factor of the amplifier so that gate G-2 operates as a unity gain device.

The blocks designated E.F. are emitter-follower stages which may be of any suitable conventional design. In viewing FIG. 1, it is readily noted that where the output of a preceding gate is required to drive the inputs of a plurality of subsequent gates, it is advisable to utilize the emitter-follower stages as impedance matching devices for increasing the efficiency and for reducing the amplitude distortion of the signals. A further advantage in employing these emitter-follower amplifier stages is that a more rapid response may be realized by such interstage coupling.

The blocks designated CA-1 are command information gates which function as a repeater amplifier arrangement for increasing the voltage of the D.C. command singals. These command information gates include signal passing gates substantially identical to gates G-1 with the output being transformer-coupled to a subsequent voltage amplifier stage. The voltage amplifier stage, in turn, is transformer-coupled to a push-pull power amplifier stage with the output of the power amplifier stage connected to a bridge rectifier circuit wherein higher magnitudes of D.C. voltages are available. These command information gates are inherently fail-safe in that a D.C. output is only available during the presence of a particular positive command signal as will be more fully described hereinafter.

The blocks designated CA-2 are relay driver amplifier stages which function as final output amplifies for interconnecting the decoding logic matrix and the speed control servo unit. These relay driver amplifiers are very similar to the command information gate circuits with the exception that the signal passing gate has been omitted therefrom. The relay driver amplifier circuit includes an RC coupling network interconnected to a voltage amplifier stage. The voltage amplifier output is transformer-coupled to a push-pull power amplifier stage which, in turn, is transformer-coupled to a bridge circuit which rectifies and provides D.C. output signals to suitable relay means. Since the relay driver amplifiers are utilized for energizing power safety relays the power and, in particular, the voltage gain of amplifier stages CA–2 are of greater magnitude than those of stages CA–1.

The above described blocks are arranged as illustrated in FIG. 1 to produce a speed command decoder network which is illustrative of one embodiment of the present invention wherein selected ones of five inputs are capable of energizing a selected one of nine outputs.

As shown in FIG. 1, the standard amplitude alternating current signals from signal source 10 are applied to each of the command information gates CA–1, namely, gates 11, 12, 13, 14 and 15. Output signals from the standard amplitude signal source 10 are also applied to G–1 signal passing gate 16. Similarly, the output signals from standard amplitude signal source 10 are also applied to G–2 signal stop gate 17. Also, the output signals from standard amplitude signal source 10 are applied to G–1 signal passing gate 18. The output from signal passing gate 16 is connected to the A.C. input of a G–2 signal stop gate 19. The output from signal stop gate 17 is connected to the A.C. input of a G–1 signal passing gate 20. Likewise, the output from signal passing gate 18 is connected to the A.C. input of a G–1 signal passing gate 21. An emitter-follower 22 interconnects the output from the signal stop gate 19 to the first gating stage of a first plurality of three stage parallel circuits. For example, the output from emitter-follower 22 is connected to the A.C. input of signal passing gate 25, the signal stop gate 26, and the signal stop gate 27. Similarly, an emitter-follower 23 interconnects the output from signal passing gate 20 to the first gating stage of a second plurality of three stage parallel circuits. For example, the output of emitter-follower 23 is connected to the A.C. input of signal passing gate 28, signal stop gate 29, and signal stop gate 30. Likewise, an emitter-follower 24 interconnects the output from signal passing gate 21 to the first gating stage of a third plurality of three stage parallel circuits. For example, the output from emitter-follower 24 is connected to the A.C. input of signal passing gate 31, signal stop gate 32, and signal stop gate 33.

The outputs from the first gating stages are connected to the A.C. inputs of the second gating stages. For example, the output from signal passing gate 25 is coupled to the input of signal stop gate 34. The output from signal stop gate 26 is coupled to the input of signal passing gate 35. The output from signal stop gate 27 is coupled to the input of signal stop gate 36. The output from signal passing gate 28 is coupled to the input of signal stop gate 37. The output from signal stop gate 29 is coupled to the input of signal passing gate 38. The output from signal stop gate 30 is coupled to the input of signal stop gate 39. The output from signal passing gate 31 is connected to the input of signal stop gate 40. The output from signal stop gate 32 is coupled to the input of signal passing gate 41. The output from signal stop gate 33 is coupled to the input of signal stop gate 42.

The outputs from the second gating stages are connected to the A.C. inputs of the third gating stages. For example, the output from signal stop gate 34 is coupled to the input of signal stop gate 43. The output from signal passing gate 35 is coupled to the input of signal stop gate 44. The output from signal stop gate 36 is coupled to the input of signal passing gate 45. The output from signal stop gate 37 is coupled to the input of signal stop gate 46. The output from signal passing gate 38 is coupled to the signal stop gate 47. The output from the signal stop gate 39 is coupled to the input of signal passing gate 48. The input from signal stop gate 40 is connected to the input of signal stop gate 49. The output from signal passing gate 41 is coupled to the input of signal stop gate 50. The output from signal stop gate 42 is coupled to the input of signal passing gate 51.

The A.C. outputs from the third gating stages are connected to the inputs of the relay driver or output amplifiers CA–2. For example, the signal gating stages 43, 44, 45, 46, 47, 48, 49, 50 and 51 are coupled to the inputs of relay driver amplifiers 52, 53, 54, 55, 56, 57, 58, 59 and 60, respectively, each of which may be suitably connected through output conductors 61, 62, 63, 64, 65, 66, 67, 68 and 69, respectively, to appropriate safety relays contained within the velocity control programmer.

In analyzing the logic matrix, it is readily noted that the signal passing gates G–1 and the signal stop gate G–2 are interconnected to form three quasi-tree circuits.

For example, the first quasi-tree circuit is formed by a trunk portion including signal passing gate 16 and signal stop gate 19 along with emitter-follower 22. This first quasi-tree circuit also includes three branches or branch paths. For example, the first branch path consists of signal passing gate 25, signal stop gate 34, and signal stop gate 43 along with output amplifier 52 which may provide an output for operating a suitable safety relay indicative of a speed command of 10 m.p.h. The second branch path consists of signal stop gate 26, signal passing gate 35, and signal stop gate 44 along with output amplifier 53 which may provide an output for operating a suitable safety relay indicative of a speed command of 20 m.p.h. The third branch path consists of signal stop gate 27, signal stop gate 36, and signal passing gate 45 along with output amplifier 54 which may provide an output for operating a safety relay indicative of a speed command of 30 m.p.h.

The second quasi-tree circuit consists of a trunk portion including signal stop gate 17 and signal passing gate 20 along with emitter-follower 23. This second quasi-tree also includes three branches or branch paths. The first branch path includes signal passing gate 28, signal stop gate 37, and signal stop gate 46 along with output amplifier 55 which may actuate a safety relay indicative of a 40 m.p.h. speed command. The second branch path includes a signal stop gate 29, signal passing gate 38, and signal stop gate 47 along with output amplifier 56 which may actuate a safety relay indicative of a 50 m.p.h. speed command. The third branch includes signal stop gate 30, signal stop gate 39, and signal passing gate 48 along with output amplifier 57 which may actuate a safety relay indicative of a 60 m.p.h. speed command.

The third quasi-tree includes a trunk portion comprising signal passing gate 18 and signal passing gate 21 along with emitter-follower 24. The third quasi-tree also includes three branches or branch paths. The first branch path includes signal passing gate 21, signal stop gate 40, and signal stop gate 49 along with output amplifier 58 the output of which may be connected to a safety relay indicative of a 70 m.p.h. speed command. The second branch path includes signal stop gate 32, signal passing gate 41, and signal stop gate 50 along with output amplifier 59 the output of which may be connected to a safety relay indicative of a 80 m.p.h. speed command. The third branch path includes signal stop gate 33, signal stop gate 42, and signal passing gate 51 along with output amplifier 60 the output of which may be connected to a safety relay indicative of a 90 m.p.h. speed command.

The command information gate 11 has its output coupled to the D.C. inputs of signal passing gate 16, signal stop gate 17, and signal passing gate 18 which form the first stage of each of the three trunk portions. The command information gate 12 has its output connected to signal stop gate 19, signal passing gate 20, and signal passing gate 21 which form the second stage of each of the three trunk portions. The command information gate 13 has its output connected to the D.C. inputs of signal passing gate 25, signal stop gate 26, signal stop gate 27, signal passing gate 28, signal stop gate 29, signal stop gate 30, signal passing gate 31, signal stop gate 32, and signal stop gate 33 which form the first stage of each of the nine branch paths. The command information gate 14 has its output connected to the D.C. inputs of signal stop gate 34, signal passing gate 35, signal stop gate 36, signal stop gate 37, signal passing gate 38, signal stop gate 39, signal stop gate 40, signal passing gate 41, and signal stop gate 42 which form the second stage of each of the nine branch paths. The command information gate 15 has its output coupled to the D.C. inputs of signal stop gate 43, signal stop gate 41, signal passing gate 45, signal stop gate 46, signal stop gate 47, signal passing gate 48, signal stop gate 49, signal stop gate 50, and signal passing gate 51 which form the third stage of each of the nine branch paths.

In the following explanation of FIG. 1, it is assumed that the train carried apparatus is receiving a suitable speed command in coded form from the running rails. Further, it is assumed that the coded information is in the form of a 990 modulated carrier, namely, carrier FC1 modulated by modulating frequency FM1. The speed command receiver demodulates the coded information and provides appropriate positive D.C. speed command potentials on conductors 2 and 4. In the present instance, the circuit parameters are such that the positive D.C. potential from the speed command receiver must fall within the range of 5 to 15 volts for providing a true indication, wherein a true indication is defined as a signal quantity being present.

As previously mentioned, the command information gates CA-1 are D.C. gated A.C. amplifiers which produce a rectified D.C. output during the presence of both A.C. signals from the standard amplitude signal source 10 and a positive D.C. speed command potential from the speed command receiver.

While the A.C. signals from the standard amplitude signal source 10 are applied to all the command information gates, the required D.C. gating potential is only present on conductors 2 and 4 of gates 11 and 13, respectively. Accordingly, these two gates are the only command information gates producing a positive D.C. output at this time, due to the absence of positive gating D.C. potentials from conductors 3, 5 and 6. In the instant case, the circuit parameters of the command information gates are such that with both A.C. and D.C. signals present the command information gates are capable of producing a positive 10 volt D.C. output signal. As described above, the output from command information gate 11 is connected to the signal passing gate 16, signal stop gate 17, and signal passing gate 18. The positive 10 volt D.C. signal from command information gate 11 is effective in conditioning gates 16 and 18 to their signal passing operational mode while the positive 10 volt D.C. signal from command information gate 11 is effective in conditioning gate 17 to its signal blocking operational mode. With no positive 10 volt D.C. signal being produced by command information gate 12 due to the lack of a D.C. gating potential, the signal stop gate 19 remains in a signal passing operational mode while the signal passing gates 20 and 21 remain in a signal blocking operational mode. As previously mentioned, the output from command information gate 13 is connected to signal pasing gates 25, 28 and 31 along with signal stop gates 26, 27, 29, 30, 32 and 33. The positive 10 volt D.C. tignal is effective in conditioning signal passing gates 25, 28 and 31 to their signal passing operational mode while the positive 10 volt D.C. signal is effective in conditioning gates 26, 27, 29, 30, 32 and 33 to their signal blocking operational mode. Command information gates 14 and 15 are not producing the positive 10 volt D.C. signal due to the lack of the required D.C. gating potential on conductors 5 and 6, respectively. Under this condition, signal stop gates 34, 36, 37, 39, 40 and 42 remain in a signal passing operational mode while signal passing gates 35, 38 and 41 remain in a signal blocking operational mode. Similarly, signal stop gates 43, 44, 46, 47, 49 and 50 remain in a signal passing operational mode while signal passing gates 45, 48 and 51 remain in a signal blocking operational mode.

Thus, it can be seen that a circuit path is established from standard amplitude signal source 10 through signal passing gate 16, signal stop gate 19, emitter-follower 22, signal passing gate 25, signal stop gate 34, signal stop gate 43 to power amplifier 52 which produces an output for energizing a suitable safety relay of the vehicle control programmer which is indicative of a speed command of 10 m.p.h. As is readily apparent, this is the only complete circuit path available under the assumed conditions since signal stop gates 26 and 27 block the signal passage to the other branch paths of the first quasi-tree circuit, while signal stop gate 17 effectively blocks the signals to the second quasi-tree circuit and signal passing gate 21 blocks further passage of the signal to the third quasi-tree circuit. Thus, it can be seen that the speed command decoding apparatus is effective in establishing a circuit path from standard amplitude signal source 10 to a selected one of a plurality of inputs in response to coded information being received by the train carried apparatus.

Now let us assume that conditions have changed so that the train carried apparatus is receiving coded information in the form of alternately 990 and 1170 modulated carriers wherein the modulating frequency is FM3, namely, 10 cycles per second. Under the previously mentioned code format, an output should appear on output conductor 69 which is indicative of a speed command of 90 m.p.h. In this case, the speed command information is picked up from the running rails and is applied to the speed command receiver which demodulates the coded information and provides appropriate positive D.C. gating potentials on conductors 2, 3 and 6. Accordingly, the command information gates 11, 12 and 15 are gated by the positive D.C. gating potential on conductors 2, 3 and 6 so that each of these command information gates produces a positive 10 volt D.C. signal. With no D.C. gating potentials on conductors 4 and 5, the command information gates 13 and 14 are incapable of producing an output signal. As previously mentioned, the positive 10 volt D.C. signal from command information gate 11 is effective in conditioning gates 16 and 18 to their signal passing operational mode while a positive 10 volt D.C. signal from command information gate 11 is effective in conditioning gate 17 to its signal blocking operational mode. Since command information gate 12 is now producing an output signal, this positive 10 volt D.C. output signal is effective in conditioning gate 19 to its signal blocking operational mode and is effective in conditioning gates 20 and 21 to their signal passing operational mode. However, under the presently assumed condition, command information gates 13 and 14 are not producing a positive 10 volt D.C. signal due to the lack of the required D.C. gating potential on conductors 4 and 5, respectively. Accordingly, signal passing gates 25, 28 and 31 remain in a signal blocking condition while signal stop gates 26, 27, 29, 30, 32 and 33 remain in a signal passing condition. Similarly, signal stop gates 34, 36, 37, 39, 40 and 42 remain in a signal passing condition while signal passing gates 35, 38 and 41 remain in a signal blocking condition. However, command information gate 15 is now producing an output signal so that this positive 10 volt D.C. output signal is effective in conditioning gates 45, 48 and 51 to their signal passing operational mode while this positive 10 volt D.C. output signal is effective in conditioning gates 43, 44, 46, 47, 49 and 50 to their signal blocking operational mode.

Thus, it can be seen that a circuit path is now established from the standard amplitude signal source 10 through signal passing gate 18, signal passing gate 21, emitter-follower 24, signal stop gate 33, signal stop gate 42, signal passing gate 51 to power amplifier 60 which produces an output on conductor 69 for actuating a suitable safety relay of the vehicle control programmer which is indicative of a speed command of 90 m.p.h. Further-more, it is readily noted that under this latter assumed condition this is the only complete circuit path established since signal passing gates 31 and 41 prevent signal passage to the other branch paths of the third quasi-tree circuit, while signal stop gate 19 blocks the signals to the first quasi-tree circuit, and signal stop gate 17 blocks further passage of the signal to the second quasi-tree circuit. Thus, it can be seen that gating potentials on conductors 2, 3 and 6 which ahe representative of carrier frequencies FC1 and FC2, and modulating signal FM3, are effective in establishing a circuit path from the standard amplitude signal source 10 to output conductor 69 which is indicative of a 90 m.p.h. speed command.

The following is a verbal analysis of the particular circuit paths which are established when the various combinations of FC and FM signals are presented on the input conductors.

As previously mentioned, the presence of FC1 and FM1 is effective in establishing a circuit path from standard amplitude signal source 10 through signal passing gate 16, signal stop gate 19, emitter-follower 22, signal passing gate 25, signal stop gate 34, signal stop gate 43 to power amplifier 52 for producing an output on conductor 61 indicative of a 10 m.p.h. speed command.

With FC1 and FM2 signals present, a circuit path is established from the standard amplitude signal source 10 through signal passing gate 16, signal stop gate 19, emitter-follower 22, signal stop gate 26, signal passing gate 35, signal stop gate 44 to power amplifier 53 for producing an output on conductor 62 indicative of a 20 m.p.h. speed command.

With FC1 and FM3 signals present, a circuit path is established from standard amplitude signal source 10, through signal passing gate 16, signal stop gate 19, emitter-follower 22, signal stop gate 27, signal stop gate 36, signal passing gate 45 to power amplifier 54 for producing an output on conductor 63 indicative of a 30 m.p.h. speed command.

With FC2 and FM1 signals present, a circuit path is established from the standard amplitude signal source 10 through signal stop gate 17, signal passing gate 20, emitter-follower 23, signal passing gate 28, signal stop gate 37, signal stop gate 46 to power amplifier 55 which produces an output on conductor 64 indicative of a 40 m.p.h. speed command.

With FC2 and FM2 signals present, a circuit path is established from the standard amplitude signal source 10 through stop gate 17, signal passing gate 20, emitter-follower 23, signal stop gate 29, signal passing gate 38, signal stop gate 47 to power amplifier 56 which produces an output on conductor 65 indicative of a 50 m.p.h. speed command.

With FC2 and FM3 signals present, a circuit path is established from the standard amplitude signal source 10 through signal stop gate 17, signal passing gate 20, emitter-follower 23, signal stop gate 30, signal stop gate 39, signal passing gate 48 to power amplifier 57 which produces an output on conductor 66 indicative of a 60 m.p.h. speed command.

With inputs FC1, FC2 and FM1 present, a circuit path is established from standard amplitude signal source 10 through signal passing gate 18, signal passing gate 21, emitter-follower 24, signal passing gate 31, signal stop gate 40, signal stop gate 49 to power amplifier 58 which produces an output on conductor 67 indicative of a 70 m.p.h. speed command.

With inputs FC1, FC2 and FM2 present, a circuit path is established from standard amplitude signal source 10 through signal passing gate 18, signal passing gate 21, emitter-follower 24, signal stop gate 32, signal passing gate 41, signal stop gate 50 to power amplifier 59 which produces an output on conductor 68 indicative of a 80 m.p.h. speed command.

With inputs FC1, FC2 and FM3 present, a circuit path is established from the standard amplitude signal source 10 through signal passing gate 18, signal pasing gate 21, emitter-follower 24, signal stop gate 33, signal stop gate 42, signal passing gate 51 to power amplifier 60 which produces an output on conductor 69 indicative of a 90 m.p.h. speed command.

It should be noted that the decoder network requires that at least one FC input be present and that at least one FM ouput be present in order to establish a circuit path from source 10 to a selected one of the plurality of outputs. For example, the absence of both FC1 and FC2 causes signal passing gates 16, 18, 20 and 21 to assume a signal blocking condition so that signals from source 10 are effectively blocked. Similarly, with FM1 FM2 and FM3 all absent, the signal passing gates 25, 28 and 31 block the first branch of each of the quasi-tree circuits, signal passing gates 35, 38 and 41 block the second branch of each of the three quasi-tree circuits, and signal passing gates 45, 48 and 51 block the third branch path of each of the three quasi-tree circuits. Accordingly, maximum reliability and safety are ensured in that at least one carrier and one modulating frequency must be present in order to ensure proper operation.

It is evident that the speed command decoder network is completely fail-safe in that each critical element making up the network operates on a fail-safe basis. That is, a component failure within either the standard amplitude signal source 10, signal passing gates, command information gates, or power amplifier is effective in interrupting the completed circuit path so that no output is available to the velocity control programmer which, as previously mentioned, is instructed, therefore, either to stabilize at a lower safety speed than commanded or to stop all operation by applying the brakes.

The G–2 signal block gates are intrinsically safe elements since it is noted that a D.C. inhibiting potential is required to stop signal passage and, accordingly, any component failure within the gate does the same thing.

Similarly, the emitter-follower stages are fail-safe in that normal component failures within these stages stops or interrupts the circuit integrity which is a more restrictive mode of operation.

The integrity of the input D.C. gating potentials to the command information gates CA–1 are assured by and are the responsibility of the speed command receiver.

Accordingly, the speed command decoder network is inherently fail-safe in that no output is capable of being produced when circuit integrity is lost.

It is readily apparent that the specific speed range of 10 through 90 m.p.h. shown in FIG. 1 are merely illustrative and, therefore, any particular speed rate may be assigned to each of the plurality of output conductors.

Referring particularly to FIG. 2, there is shown the second embodiment of the present invention wherein selected ones of four inputs are capable of energizing a selected one of six outputs. The various components of FIG. 2 which correspond to similar components in FIG. 1 have been given similar reference designations.

As shown in FIG. 2, standard amplitude alternating current signals from the signal source 10 are illustrated as being applied to each of the command information gates CA–1, in the present case to gates 11, 12, 14 and 15. Output signals from the standard amplitude signal source 10 are also applied to G–1 signal passing gates 16 and 18. Likewise, the output signals from standard amplitude signal source 10 are also applied to G–2 signal stop gate 17. The output from signal passing gate 16 is connected to the A.C. input of G–2 signal stop gate 19. The output from signal stop gate 17 is connected to the A.C. input of G–1 signal passing gate 20. Likewise, the output from signal passing gate 18 is connected to the A.C. input of G–1 signal passing gate 21. The output from the signal stop gate 19 is connected to the A.C. input of both of the G–1 signal passing gates 35 and 45. Similarly, the output from the signal passing gate 20 is connected to the A.C. input of both of the G–1 signal passing gates 38 and 48. Likewise, the output from signal passing gate 21 is connected to the A.C. input of both of the G–1 signal passing gates 41 and 51.

In the embodiment shown in FIG. 2, the signal passing gates and the signal stop gates are arranged as three two-branch quasi-tree arrangements. However, it is readily noted that each of the branches or branch paths in the present embodiment are formed by a single stage signal passing gate G–1. The output from each single stage signal passing gate is directly connected to the input of a relay driver or output amplifier CA–2. For example, signal passing gates 35, 45, 38, 48, 41 and 51 are coupled to the inputs of relay driver amplifiers 52, 53, 54, 55, 56 and 57, respectively, with the output of each driver amplifier suitably coupled through conductors 61, 62, 63, 64, 65 and 66 to appropriate relays indicative of speeds S1, S2, S3, S4, S5 and S6, respectively.

In reviewing the logic matrix of FIG. 2, it is readily noted that the G–1 signal passing gates and the G–2 signal stop gates are interconnected to form three-two branch quasi-tree circuits. However, it may be noted that the emitter-follower stages have been eliminated from FIG. 2. In cases where the impedance characteristics require no matching and signal losses and response time fall within tolerable limits such interstage coupling may be omitted.

The command information gate 11 has its output coupled to the D.C. inputs of signal passing gates 16, signal stop gate 17 and signal passing gate 18 which form the first stage of each of the trunk portions of the three quasi-tree circuits. The command information gate 12 has its output connected to the signal stop gate 19, signal passing gate 20, and signal passing gate 21 which form the second stage of each of the trunks of the three quasi-tree circuits. The command information gate 14 has its output connected to the inputs of signal passing gate 35, signal passing gate 38, and signal passing gate 41 which form the first branch path of each of the three quasi-tree circuits. The command information gate 15 has its output connected to signal passing gate 45, signal passing gate 48 and signal passing gate 51 which form the second branch path of each of the three quasi-tree circuits.

Like in FIG. 1, the speed command decoder network of FIG. 2 requires that the speed command receiver provide at least one carrier frequency signal on either conductor 2 or 3 and at least one modulating signal on conductor 5 or 6 in order to establish a complete circuit path from the standard amplitude signal source to the velocity control programmer which may be indicative of a valid speed command. With this in mind, it is assumed that the speed command receiver is providing suitable gating potentials on conductors 2 and 5. Accordingly, with the suitable gating potential on conductor 2, command information gate 11 is producing a positive 10 volt D.C. output signal, and with a suitable gating potential on conductor 5, command information gate 14 is similarly producing a positive 10 volt D.C. output signal. The positive 10 volt speed output signal from command information gate 11 is effective in conditioning gates 16 and 18 to their signal passing operational mode while the positive 10 volt D.C. output from command information gate 11 is effective in conditioning gate 17 to its signal blocking operational mode. With no positive 10 volt D.C. signal being produced by command information gate 12 due to the lack of a D.C. gating potential on conductor 3, the signal stop gate 19 remains in a signal passing condition while the signal passing gates 20 and 21 remain in their signal blocking condition. Since conductor 5 is provided with a suitable gating potential, command information gate 14 is producing a positive 10 volt D.C. output signal for conditioning gates 35, 38 and 41 to their signal passing operational mode. Since conductor 6 has no gating potential, command information gate 15 is not producing an output so that signal passing gates 45, 48 and 51 remain in their signal blocking condition.

Thus, it can be seen that a circuit path is established from the standard amplitude signal source 10 through signal passing gate 16, signal stop gate 19, and signal passing gate 35 to power amplifier 52 which produces an output on conductor 61 for energizing a suitable safety relay contained by the vehicle control programmer which is indicative of an S1 speed command. Further, it is readily noted that this is the only complete path established under the assumed conditions since signal passing gate 45 effectively blocks the signals to the second branch path of the first quasi-tree circuit, and signal stop gate 17 effectively blocks the signals from source 10 to the second quasi-tree circuit, while signal passing gate 21 blocks further passage of the signals to the third quasi-tree circuit.

The following are the various circuit paths which are established when different combinations of the FC and FM signals are present on selected ones of the input conductors 2, 3, 5, or 6.

With signals FC1 and FM3 present, a circuit path is established from the standard amplitude signal source 10 through signal passing gate 16, signal stop gate 19, and signal passing gate 45 to power amplifier 53 for producing an output on conductor 62 indicative of an S2 speed command.

With signals FC2 and FM2 present, a circuit path is established from standard amplitude signal source 10 through signal stop gate 17, signal passing gate 20, and signal passing gate 38 to power amplifier 54 which produces an output on conductor 63 indicative of an S3 speed command.

With signals FC2 and FM3 present, a circuit path is established from the standard amplitude signal source 10 through signal stop gate 17, signal passing gate 20, and signal passing gate 48 to power amplifier 55 which produces an output on conductor 64 indicative of an S4 speed command.

With inputs FC1, FC2 and FM2 present, a circuit path is established from standard amplitude signal source 10 through signal passing gate 18, signal passing gate 21, and signal passing gate 41 to power amplifier 56 which produces an output on conductor 65 indicative of an S5 speed command.

With inputs FC1, FC2 and FM3 present, a circuit path is established from the standard amplitude signal source 10 through signal passing gate 18, signal passing gate 21, and signal passing gate 51 to power amplifier 57 for producing an output on conductor 66 indicative of an S6 speed command.

Thus, it can be seen that selected ones of four inputs are capable of completing a circuit path for providing a selected one of six outputs each of which may be assigned a discrete speed level in accordance with any desired or particular application.

As previously mentioned, the integrity of the D.C. gating signals appearing on conductors 2, 3, 5, and 6 from a fail-safe standpoint is ensured by the speed command receiver apparatus which receives the coded information from the running rails.

Similarly, the speed command decoder network is designed for fail-safe operation so that a failure of a particular component or combination of components will result in a more restrictive operational condition. For example, if the standard amplitude signal source 10 should fail, the necessary A.C. input signals for the various gates are no longer available so that it is impossible to complete and transmit a valid speed command to the velocity control programmer. Further, when any of the remaining elements or components fail, circuit integrity is lost and results in the interruption of the completed circuit path due to the absence of either the A.C. or D.C. input signals. It is readily evident that with the interruption of the established circuit path no output is available on any output conductor and the most restrictive condition is assumed. Obviously, such fail-safe operation ensures that an invalid speed command is incapable of being transmitted to the velocity control programmer so that the possibility of establishing a potentially dangerous condition is substantially eliminated. Accordingly, a security check for determining circuit integrity is inherently performed prior to allowing an output signal to appear on any of the output conductors.

In case a certain installation requires only five outputs, it may be desirable to modify the embodiment shown in FIG. 2 in the manner as illustrated in FIG. 3. In this embodiment, the third quasi-tree circuit has been modified to contain only a single branch or branch path so that the output signals from signal passing gates 21 which forms the second stage of the trunk portion are directly connected to only signal passing gate 51. The output from signal passing gate 51 is connected, as mentioned above, to power amplifier 57 which produces an output on conductor 66 indicative of an S6 speed command. However, in FIG. 3, the required positive 10 volt output signal for gate 51 is provided by an OR gate 75. The OR gate which may, for example, be a conventional dual input diode arrangement, is shown having one input connected to the command information gate 14 with the other input connected to command information gate 15. Accordingly, the presence of either of the two inputs is capable of gating the OR gate so that an output is produced. In the present case, the output takes the form of a positive 10 volt D.C. signal which, in turn, is applied to the input of signal passing gate 51.

The need for OR gate 75 arises from the fact that when a moving train or vehicle leaves one speed zone and enters an adjacent speed zone having a speed command in the third range, a transitional period occurs in which no output is being produced by the speed command decoder network. For example, let us assume that a train or vechile is moving in a speed zone having coded information in the form of carrier FC2 and modulating signal FM2 and thereafter enters a zone in which the coded information is in the form of FC1, FC2 and modulating signal FM3. As the train enters the second zone, the speed command receiver requires a finite amount of time or transitional period for changing over to this third range speed command whereby suitable gating signals may be applied to conductors 2, 3 and 6 in correspondence therewith. Since during this transitional period, no input would appear on conductor 6, the speed command decoder network would not be capable of completing a circuit path to output conductor 66. Obviously, such a condition is undesirable in mass transit operation since no output or the lack of an output on all of the output conductors is representative in a braking or a reduction in speed commands. With the use of OR gate 75 this transitional condition has been alleviated in that a positive 10 volt signal from command information gate 15 is initially effective in gating OR gate 75 for providing the required positive 10 volt signal to signal passing gate 51 so that a complete circuit path may be established to the S6 speed command. Thereafter, the positive 10 volt output signal from command information gate 14 is effective in gating OR gate 75 and retaining the necessary signal on signal passing gate 51. The remaining portions of the embodiment shown in FIG. 3 are substantially identical to those shown in FIG. 2 so that it is possible to produce a select one of five output signals by means of applying selected ones by a plurality of four input signals on conductors 2, 3, 5 and 6. The embodiment shown in FIG. 3 is possessed with the same attributes as the embodiments shown in FIGS. 1 and 2, therefore, this speed command decoding network operates in a fail-safe fashion.

It will be apparent from the foregoing that the subject decoding arrangements may be expanded so that additional indications or speed command may be provided if necessary by the addition of other modulating signals and/or carrier frequencies. Similarly, it is obvious that the disclosed speed command decoder networks can be simplified to provide a lesser number of outputs by using only a portion of the modulating and/or carrier frequencies to that disclosed.

It will also be appreciated that while this invention finds particular utility in speed control systems, it is readily evident that the invention is not merely limited thereto, but may be employed in various systems and apparatus which require the security and safety inherent in this invention. But regardless of the manner in which the invention is used, it is to be understood that various alterations may be made by persons skilled in the art without departing from the spirit and scope of this invention. It will be also apparent, that other modifications can be made in the presently described invention and, therefore, it is to be understood that all changes, equivalents and modifications within the spirit and scope of the present invention are herein meant to be in the appended claims.

Having thus described our invention, what we claim is:

1. A fail-safe decoding network for delivering a selected one of a plurality of output signals in response to reception of at least two preselected inputs of a plurality of input signals comprising: a plurality of input conductors, a plurality of output conductors, a source of alternating current signals, a logic circuit including a plurality of fail-safe electronic means electrically interconnected and arranged to establish a predetermined circuit path between said alternating current signal source and a selected one of said plurality of output conductors only in response to the application of said preselected inputs to at least two of said plurality of said input conductors and that an unsafe network malfunction or a component failure produces a more restrictive output signal or no output signal at all.

2. A fail-safe decoding network as set forth in claim 1 wherein said plurality of fail-safe electronic means of said logic circuit form quasi-tree circuit means.

3. A fail-safe decoding network as set forth in claim 2 wherein said quasi-tree circuit means include trunk and branch portions.

4. A fail-safe decoding network as set forth in claim 3 wherein said alternating current signal source is electrically connected to said trunk portion and said output conductors are electrically connected to said branch portions.

5. A fail-safe decoding network as set forth in claim 1 wherein said plurality of fail-safe electronic means of said logic circuit form a plurality of quasi-tree circuits with each of said tree circuits having trunk and branch portions.

6. A fail-safe decoding network as set forth in claim 5 wherein said trunk portion of each of said quasi-tree circuits includes at least two of said pluraltiy of fail-safe electronic means and said branch portions of each of said quasi-tree circuits include at least one of said plurality of fail-safe electronic means.

7. A fail-safe decoding network as set forth in claim 6 wherein an amplifier means is electrically interposed between each of said plurality of input conductors and each of said plurality of electronic means.

8. A fail-safe decoding network as set forth in claim 7 wherein a power amplifier is electrically interposed between each of said fail-safe electronic means contained by said branch portions and each of said plurality of output conductors.

9. A fail-safe decoding network as set forth in claim 7 wherein each of said plurality of fail-safe electronic means are in the form of signal controlling gates which may effectively pass or block signals from said alternating current signal source in response to output signals derived from amplifier means.

10. An information decoding network for producing a selected one of a plurality of output signals in response to reception of at least two preselected inputs of a plurality of input signals comprising: a plurality of input conductors, a plurality of output conductors, a source of square-wave signals, a logic circuit having a plurality of fail-safe gating elements electrically interconnected and adapted to establish a circuit path from said square-wave signal source to a selected one of said plurality of output conductors only in response to the energization of preselected ones of said plurality of input conductors by said preselected input signals and that any unsafe network malfunction or component failure causes a more restrictive output signal or no output signal at all to be produced.

11. An information decoding network as defined in claim 10 wherein said plurality of fail-safe gating elements form tree circuit means having trunk and branch portions.

12. An information decoding network as defined in claim 10 wherein said plurality of fail-safe gating elements form three three-branch tree circuits.

13. An information decoding network as defined in claim 10 wherein said plurality of fail-safe gating elements form three two-branch tree circuits.

14. An information decoding network as defined in claim 10 wherein said plurality of fail-safe gating elements form two two-branch tree circuits and one one-branch tree circuit.

15. An information decoding network as defined in claim 12 wherein said plurality of input conductors number at least five and said plurality of output conductors number at least nine.

16. An information decoding network as defined in claim 13 wherein said plurality of input conductors number at least four and said plurality of output conductors number at least six.

17. An information decoding network as defined in claim 14 wherein said plurality of input conductors number at least four and said plurality of output conductors number at least five.

18. An information decoding network as defined in claim 12 wherein amplifier means are electrically interposed between each of said plurality of input conductors and each of said plurality of fail-safe gating elements.

19. An information decoding network as defined in claim 12 wherein amplifier means are electrically interposed between each of said output conductors and said branch portions of said tree circuit means.

20. A decoding apparatus comprising a plurality of input conductors, a plurality of gated amplifiers electrically coupled to a separate one of said plurality of input conductors, a logic matrix having a plurality of fail-safe gate circuits electrically interconnected to form three quasi-tree circuits, each of said quasi-tree circuits having trunk and branch portions electrically interconnected with said plurality of gated amplifiers, a source of A.C. signals electrically coupled to each of said gated amplifiers and to each trunk portion of said quasi-tree circuits, a plurality of output amplifiers electrically coupled to a separate branch portion of said quasi-tree circuits, and a plurality of output conductors electrically coupled to each of said output amplifiers and wherein said apparatus produces a more restrictive output signal or no output signal at all on said output conductors upon occurrence of an unsafe electrical failure in said apparatus.

21. A decoding apparatus as defined in claim 20 wherein said trunk portion of each of said three quasi-tree circuits includes at least two cascaded fail-safe gate circuits and said branch portions of each of said three quasi-tree circuits includes at least three cascaded fail-safe gate circuits.

22. A decoding apparatus as defined in claim 20 wherein said trunk portion of each of said three quasi-tree circuits includes two cascaded fail-safe gate circuits and said branch portions of each of said three quasi-tree circuits includes at least a single fail-safe gate circuit.

23. A decoding apparatus as defined in claim 21 wherein an emitter-follower stage electrically interconnects said trunk portion of each of said three quasi-tree circuits with said branch portions of said three quasi-tree circuits.

24. A decoding apparatus as defined in claim 22 wherein an OR gate electrically interconnects at least two of said plurality of gated amplifiers with at least one of said branch portions including at least a single fail-safe gate circuit.

25. In a fail-safe command information decoding network for producing a selected one of a plurality of outputs in response to the reception of at least two preselected inputs of a plurality of input signals, a plurality of input conductors for receiving the preselected input signals, a plurality of command information gates electrically coupled to separate ones of said plurality of input conductors, a standard amplitude signal source electrically coupled to each of said plurality of command information gates for delivering alternating current signals to each of said plurality of command information gates, a logic matrix comprising a plurality of signal passing gates and signal stopping gates arranged in three quasi-tree circuits with each quasi-tree circuit having trunk and branch portions, each of said signal passing and signal stopping gates of said trunk and branch portions electrically coupled to said command information gates and controlled by output signals from said command information gates, each trunk portion of said three quasi-tree circuits electrically coupled to said standard amplitude signal source for receiving alternating current signals from said standard amplitude signal source, a plurality of output amplifiers electrically coupled to a separate branch portion of said three quasi-tree circuits and a plurality of output conductors electrically coupled to separate ones of said plurality of output amplifiers with a preselected one of said output conductors capable of producing an output in accordance with which of said plurality of input conductors are receiving input signals and wherein a more restrictive output signal or no output signal at all is available on any of said output conductors upon occurrence of an unsafe network malfunction or component failure.

References Cited

UNITED STATES PATENTS

| | | | |
|---|---|---|---|
| 2,960,681 | 11/1960 | Bonn | 307—241 X |
| 3,197,709 | 7/1965 | Antonio et al. | 307—253 X |
| 2,841,748 | 7/1958 | Reynolds. | |
| 3,328,580 | 6/1967 | Staples | 246—34 |
| 3,355,598 | 11/1967 | Tuska | 340—347 X |

MAYNARD R. WILBUR, Primary Examiner

M. K. WOLENSKY, Assistant Examiner

U.S. Cl. X.R.

235—155; 246—63, 182; 307—115, 241; 328—154